Patented Aug. 4, 1936

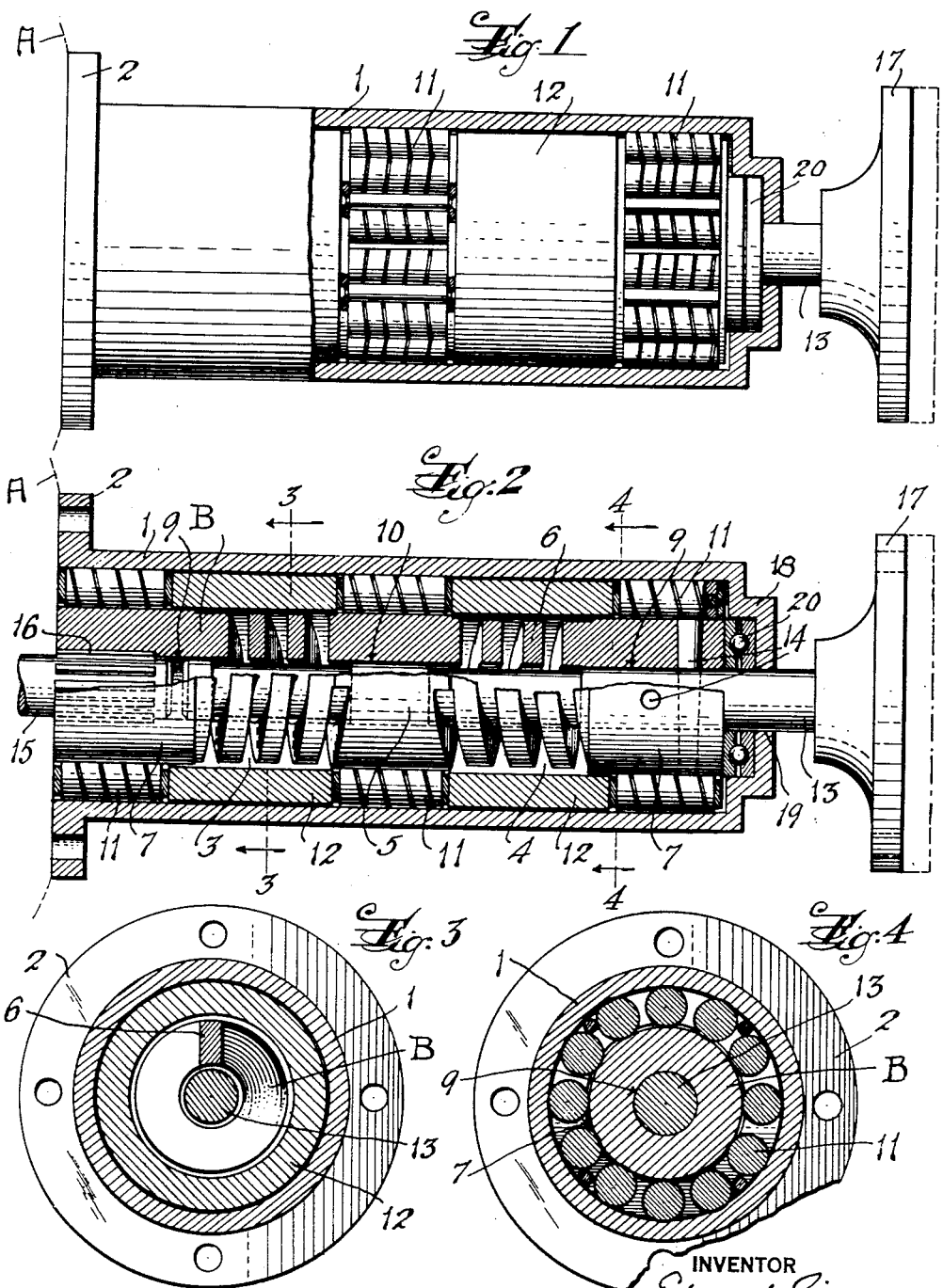

2,049,936

UNITED STATES PATENT OFFICE 2,049,936

YIELDABLE SHAFT COUPLING

Edward Zimmer, Newark, N. J.

Application January 22, 1935, Serial No. 2,898

2 Claims. (Cl. 64—27)

This invention relates to a drive shaft to be connected between a driving element and a driven element for the purpose of reducing the strains, especially torque strains, upon one or the other of said elements, for example the strains which result from variation in application of power by the driving element to the driven element, or from variation in resistance applied by the driven element against the driving element; and more particularly, this invention is directed to a drive or propeller shaft for automobiles for transmitting power from the engine to the rear or driving wheels. This invention relates in particular to my Patent No. 1,987,316, dated January 8, 1935.

One of the major difficulties in the use of such yieldable drive shafts or yieldable couplings is the vibration of the shaft or coupling during use, and the possibility of twisting of the coupling in such a manner as to damage it or render it entirely unfit for use. Yieldable drive shafts or couplings of this character must be capable of withstanding heavy strains, and to transmit high power, and many of the heretofore proposed structures have failed because of their inherent weakness or because they are too complicated and costly for practical use.

A prime object of the present invention is to provide a yieldable shaft coupling which shall embody novel and improved features of construction whereby the coupling shall be short and compact so that the tendency to vibration thereof shall be reduced to the minimum, and the coupling shall be capable of withstanding heavy strains and hard usage without danger of breaking down. Other objects are to provide a yieldable shaft coupling of this character which shall be relatively simple and inexpensive in construction and which shall be universally applicable for coupling driving and driven shafts or shaft sections; and to obtain other advantages and results as will be brought out by the following description.

Referring to the accompanying drawing in which corresponding and like parts are designated throughout the several views by the same reference characters Figure 1 is a side elevation of a yieldable shaft coupling embodying the invention with a portion of the casing broken away.

Figure 2 is a longitudinal vertical sectional view through the coupling showing the spring coupler partially in side elevation.

Figure 3 is a transverse vertical sectional view on the line 3—3 of Figure 2, and Figure 4 is a similar view on the line 4—4 of Figure 2.

Specifically describing the illustrated embodiment of the invention, the yieldable shaft coupling includes a casing 1 to be fixedly mounted as upon a transmission gear case or on the differential case of an automobile. As shown, one end of the casing has a flange 2 for connecting it for example to a transmission gear casing A indicated by dot and dash lines on Figure 1.

Within the casing is rotatably journaled a spring coupler B, and as shown this coupler preferably comprises a tube having two helical slots 3 and 4, the adjacent ends of which are spaced apart longitudinally of the tube as indicated at 5, while the other ends terminate short of the respective ends of the tube. The slots 3 and 4 form two helical spring sections and preferably the slots are so formed that the convolutions 6 of the spring sections are rectangular in cross section with the longer dimension perpendicular to the axis of the tube. It is also desirable that the helixes of the spring sections formed by the slots 3 and 4 be respectively right hand and left hand.

The ends of the coupler have rigid exterior bearing surfaces 7, and the portion 5 of the coupler between the spring sections is also preferably rigid to form a bearing surface. Similarly the interior walls of the coupler at and between its ends have rigid bearing surfaces 9 and 10 respectively.

For rotatably journaling the coupler B in the casing 1, the exterior bearing surfaces 5 and 7 may have a nice frictionally sliding contact with the interior of the casing, but preferably anti-friction elements such as roller bearings 11 are interposed between the bearing surfaces and the walls of the casing. Spacer sleeves 12 may be provided for holding the roller bearings in proper relation to the bearing surfaces and against longitudinal movement.

For connecting the spring coupler B to the shaft sections to be coupled together, one of the shaft sections 13 may be fitted into the coupler in nicely contacting relation to the inner bearing surfaces 9 and 10 of the coupler, and the shaft section 13 may be rigidly connected to one end of the coupler as by pins 14. The other end of the coupler may be connected to the other shaft section 15 in any suitable manner as by a feather and spline connection 16. If desired the shaft section 13 may have a coupling flange 17 thereon for connection to a universal joint or other part to be coupled to the shaft section 13.

The convolutions of the spring sections have an exterior diameter less than the interior diameter of the spacer sleeve 12, and said convolutions have an interior diameter greater than the diameter of the shaft section 13 so as to provide for diametral expansion of the convolutions when the spring coupler is placed under torsional strain.

In use of the yieldable shaft coupling one shaft section 13 or 15 will be connected to the driving element while the other shaft section will be connected to the driven element, and power is transmitted from the driving section of the shaft through the spring coupler and the driven section, the coupler B being rotatable in the casing 1 to conform to rotation of the shaft sections. Torsional strains are imposed upon the spring coupler tending to simultaneously diametrically contract the convolutions of one spring section and diametrically expand the convolutions of the other, whereby variations in the amount of power from the driving shaft to the driven shaft or variations in resistance of the driven element against the driving element will be absorbed by the spring coupler to prevent shocks and jars and reduce the severity of strains imposed upon the driving element and the driven element.

The two spring sections will in effect balance each other by the simultaneous diametrical contraction of one and diametrical expansion of the other, and the firm support of the spring coupler by and between the bearing surfaces 9 and 10 of the shaft section 13 and by and between the bearing surfaces 5 and 7 and the casing 1 through the roller bearings 11, will prevent excessive lateral distortion of the coupler under torsional strains. Also, the longitudinal extension of the coupler incident to expansion of one spring section will be compensated by the longitudinal contraction of the coupler by diametrical contraction of the other spring section so that there are minimum strains incident to variations in length of the spring coupler.

The casing 1 effectually reenforces the coupler and shaft sections 13 and 15 against flexing and against vibration, and the shaft coupling will withstand tremendous strains in all directions, without damage. Furthermore the parts are simple and relatively inexpensive in construction so that the coupling is practical to manufacture.

Preferably one end of the casing is closed at 18 except for an opening 19 to receive the shaft section 13, while the other end of the casing is open to facilitate assembly of the parts in the casing.

If desired, anti-friction thrust bearing 20 may be interposed between the end of the casing and the adjacent end of the spring coupler to assume any thrust strains that may be imposed on the coupling.

The invention has been shown as embodied in certain details of structure for the purpose of illustrating the principles of the invention, but it should be understood that the details of structure may be widely modified and changed without departing from the spirit or scope of the invention.

Having thus described my invention, what I claim is:

1. A yieldable shaft coupling comprising a non-rotatable casing to be mounted on a support, two axially alined shaft sections, a helical torsional spring coupler journaled for rotation within said casing in coaxially telescoping relation over said shaft sections and having rigid interior and exterior circumferential bearing surfaces, said inner bearing surfaces being in nicely contacting relation to said shaft sections respectively and said exterior surfaces having a journal relation with the inner walls of said casing, said shaft sections being connected to opposite ends of said spring coupler respectively to rotate the coupler whereby said casing forms a bearing support for said coupler.

2. A yieldable shaft coupling comprising a non-rotatable casing to be mounted on a support, a spring coupler journaled for rotation within said casing formed at its ends to be connected to two axially alined shaft sections and having a helical torsional spring portion and exterior rigid circumferential bearing surfaces of a diameter greater than said spring portion, said bearing surfaces having a journaled relation to the interior of said casing, whereby said casing serves as a bearing support for said coupler.

EDWARD ZIMMER.